(12) United States Patent
Hase et al.

(10) Patent No.: US 11,251,495 B2
(45) Date of Patent: Feb. 15, 2022

(54) POWER STORAGE DEVICE

(71) Applicant: TOYOTA JIDOSHA KABUSHIKI KAISHA, Toyota (JP)

(72) Inventors: Yusuke Hase, Seto (JP); Yusuke Suzuki, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 16/397,020

(22) Filed: Apr. 29, 2019

(65) Prior Publication Data

US 2019/0348648 A1 Nov. 14, 2019

(30) Foreign Application Priority Data

May 10, 2018 (JP) .............................. JP2018-091161

(51) Int. Cl.
  *H01M 2/10* (2006.01)
  *H01M 10/647* (2014.01)
  *H01M 50/209* (2021.01)

(52) U.S. Cl.
  CPC ....... *H01M 50/209* (2021.01); *H01M 10/647* (2015.04)

(58) Field of Classification Search
  CPC ............. H01M 2/1066; H01M 10/647; H01M 10/613; H01M 10/6563; H01M 2/1077; H01M 2/206; H01M 10/0418; H01M 2/20; H01M 10/482; H01M 10/486; H01M 10/6566; H01M 10/6555; H01M 10/6557; Y02E 60/10
  See application file for complete search history.

(56) References Cited

U.S. PATENT DOCUMENTS

| 2004/0038123 | A1  |  2/2004 | Hisamitsu et al. |            |
|--------------|-----|---------|------------------|------------|
| 2010/0183920 | A1* |  7/2010 | Shaffer, II      | H01M 10/654 429/210 |
| 2011/0020676 | A1* |  1/2011 | Kurosawa         | H01M 10/615 429/62  |
| 2011/0307123 | A1* | 12/2011 | Abe              | G07C 9/00182 701/2  |
| 2018/0131047 | A1* |  5/2018 | Zhao             | H01M 2/1077 |
| 2019/0334216 | A1* | 10/2019 | Kim              | H01M 2/348  |

FOREIGN PATENT DOCUMENTS

| JP | 2004-087238 A | 3/2004 |
|----|---------------|--------|
| JP | 2005235428 A  | 9/2005 |

* cited by examiner

Primary Examiner — Muhammad S Siddiquee
(74) Attorney, Agent, or Firm — Sughrue Mion, PLLC (57) ABSTRACT

A power storage unit includes an end surface located at one end of the power storage unit in a direction, an end surface located at the other end of the power storage unit in the direction, a side surface connecting the end surface and the end surface, and a side surface located opposite to the side surface. A terminal and a terminal are provided on a side surface side and are connected to an apparatus arranged on the side surface side, and the wire extends in a direction from the side surface toward the side surface and is connected to an apparatus provided on a side surface side.

6 Claims, 8 Drawing Sheets

POWER STORAGE DEVICE

This nonprovisional application is based on Japanese Patent Application No. 2018-091161 filed on May 10, 2018 with the Japan Patent Office, the entire contents of which are hereby incorporated by reference.

BACKGROUND

Field

The present disclosure relates to a power storage device.

Description of the Background Art

Conventionally, various proposals have been made for a bipolar-type power storage device formed by stacking a plurality of bipolar electrode plates.

For example, a power storage device described in Japanese Patent Laying-Open No. 2004-87238 includes a plurality of bipolar electrode sheets stacked in an up/down direction, and separators each arranged between the bipolar electrode sheets. Each bipolar electrode sheet includes a plate-shaped current collector, a positive electrode active material layer formed on a front surface of the current collector, and a negative electrode active material layer formed on a back surface of the current collector.

The power storage device is formed in a substantially rectangular parallelepiped shape. A main positive electrode tab is formed at one short side surface of the power storage device, and a main negative electrode tab is formed at the other short side surface thereof. That is, the main positive electrode tab and the main negative electrode tab are formed at the short side surfaces opposite to each other. In addition, a plurality of measurement tabs are formed at a long side surface of the power storage device.

SUMMARY

In the power storage device described above, the main positive electrode tab and the main negative electrode tab are tabs for supplying electric power of the power storage device to the outside, and are connected to a driving apparatus and the like provided outside the power storage device.

The measurement tabs are connected to a measurement apparatus for measuring whether polarization or the like occurs in each bipolar electrode sheet.

Since the main positive electrode tab and the main negative electrode tab are provided at the short side surfaces opposite to each other, if the driving apparatus is provided on a main positive electrode tab side, it is necessary to route a power wire connected to the main negative electrode tab.

On the other hand, it is also necessary to connect the plurality of measurement tabs formed at the long side surface to the measurement apparatus using measurement wires.

Depending on how to route the power wires and the measurement wires, the wires are likely to be jumbled, and it is likely to become difficult to connect the wires to the power storage device and the apparatuses.

The present disclosure has been made in view of the aforementioned problem, and an object thereof is to provide a power storage device which facilitates connecting wires to a power storage device and other apparatuses.

A power storage device in accordance with the present disclosure includes a power storage unit, a first current collecting plate and a second current collecting plate provided to the power storage unit, a first terminal provided to the first current collecting plate, a second terminal provided to the second current collecting plate, at least one sensor provided to the power storage unit, and at least one wire connected to the sensor.

The power storage unit includes a first side surface, and a second side surface located opposite to the first side surface. The first terminal and the second terminal are provided on a first side surface side, and are connected to a first apparatus arranged on the first side surface side. The wire extends in a direction from the first side surface toward the second side surface, and is connected to a second apparatus provided on a second side surface side.

According to the power storage device described above, power wires connecting the first terminal and the second terminal to the first apparatus are drawn out on the first side surface side, and wires connected to the second apparatus are drawn out on the second side surface side. Thus, connecting the power wires to the first apparatus and connecting the wires to the second apparatus can be easily performed.

In the power storage device described above, the power storage unit includes a first end surface and a second end surface aligned in a first direction. The first side surface and the second side surface are provided to connect the first end surface and the second end surface. The first current collecting plate is provided on the first end surface, and the second current collecting plate is provided on the second end surface. The power storage unit includes a plurality of bipolar electrode plates aligned in the first direction. According to the power storage device described above, electrical resistance of the power storage device can be reduced.

The power storage device described above further includes a housing case configured to house the power storage unit, and a fan configured to supply cooling air from the first side surface side into the housing case. The power storage unit includes a third side surface located between the first side surface and the second side surface, and a fourth side surface located opposite to the third side surface. An air flowing path is formed between a wall surface of the housing case and the third side surface of the power storage unit, the cooling air flowing into the air flowing path. The power storage unit includes at least one cooling plate having a plurality of cooling paths formed therein, the cooling air having passed through the air flowing path flowing into the plurality of cooling paths. The plurality of cooling paths are formed from the first side surface side toward the second side surface side, and a flow path area of the cooling air in the air flowing path decreases from the first side surface side toward the second side surface side.

According to the power storage device described above, since the flow path area decreases from an upstream side toward a downstream side of the air flowing path, the pressure of the cooling air on the downstream side is likely to become higher than an internal pressure on the upstream side. Thus, even though the cooling air is less likely to enter the cooling paths located on the downstream side of the air flowing path due to flow resistance applied until the cooling air flows to the downstream side of the air flowing path, it is possible to cause the cooling air to also flow through the cooling paths on the downstream side due to high pressure of the cooling air on the downstream side of the air flowing path. This can suppress occurrence of variations in the flow amount of the cooling air flowing through the cooling paths.

In the power storage device described above, the power storage unit includes a first end surface and a second end surface aligned in a first direction, and a plurality of the cooling plates are arranged to be spaced from each other, from the first end surface toward the second end surface. A plurality of the sensors and a plurality of the wires are provided, and the sensors are arranged within the cooling paths. The wires are drawn out of the cooling paths from a third side surface side. Drawn-out positions where the wires are drawn out of the cooling paths are arranged to proceed from a first end surface side toward a second end surface side, as the drawn-out positions proceed from the first side surface side toward the second side surface side.

According to the power storage device described above, the number of wires within the air flowing path also increases from the upstream side toward the downstream side. Thereby, the flow path area of the air flowing path also decreases from the upstream side toward the downstream side, and the internal pressure within the air flowing path can be increased toward the downstream side.

The power storage device described above further includes a first insulating plate and a second insulating plate. The power storage unit includes a first end surface and a second end surface aligned in a first direction. The first current collecting plate is provided on the first end surface of the power storage unit, and the second current collecting plate is provided on the second end surface of the power storage unit. The first insulating plate is arranged between the first current collecting plate and the housing case, and the second insulating plate is arranged between the second current collecting plate and the housing case. The first insulating plate includes a first main plate, and a support member extending from the first main plate toward the second insulating plate to support the power storage unit.

According to the power storage device described above, the power storage unit, the first current collecting plate, and the second current collecting plate can be insulated from the housing case. Further, misalignment of the power storage unit with respect to the first insulating plate can be suppressed.

In the power storage device described above, the second insulating plate includes a second main plate, and a rib formed on the second main plate to support the power storage unit.

According to the power storage device described above, misalignment of the second insulating plate with respect to the power storage unit can be suppressed.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 5 is a perspective view showing a power storage unit 10 and the like.

FIG. 6 is a cross sectional view showing power storage unit 10 and the like.

DESCRIPTION OF THE PREFERRED EMBODIMENTS

A power storage device in accordance with the present embodiment will be described with reference to FIGS. 1 to 10. Of the components shown in FIGS. 1 to 10, identical or substantially identical components will be designated by the same reference numerals, and redundant description may be omitted. It should be noted that, of the components described in the embodiment, a component corresponding to a component recited in a claim may be written together with the component in the claim placed in parentheses.

Figure 1:
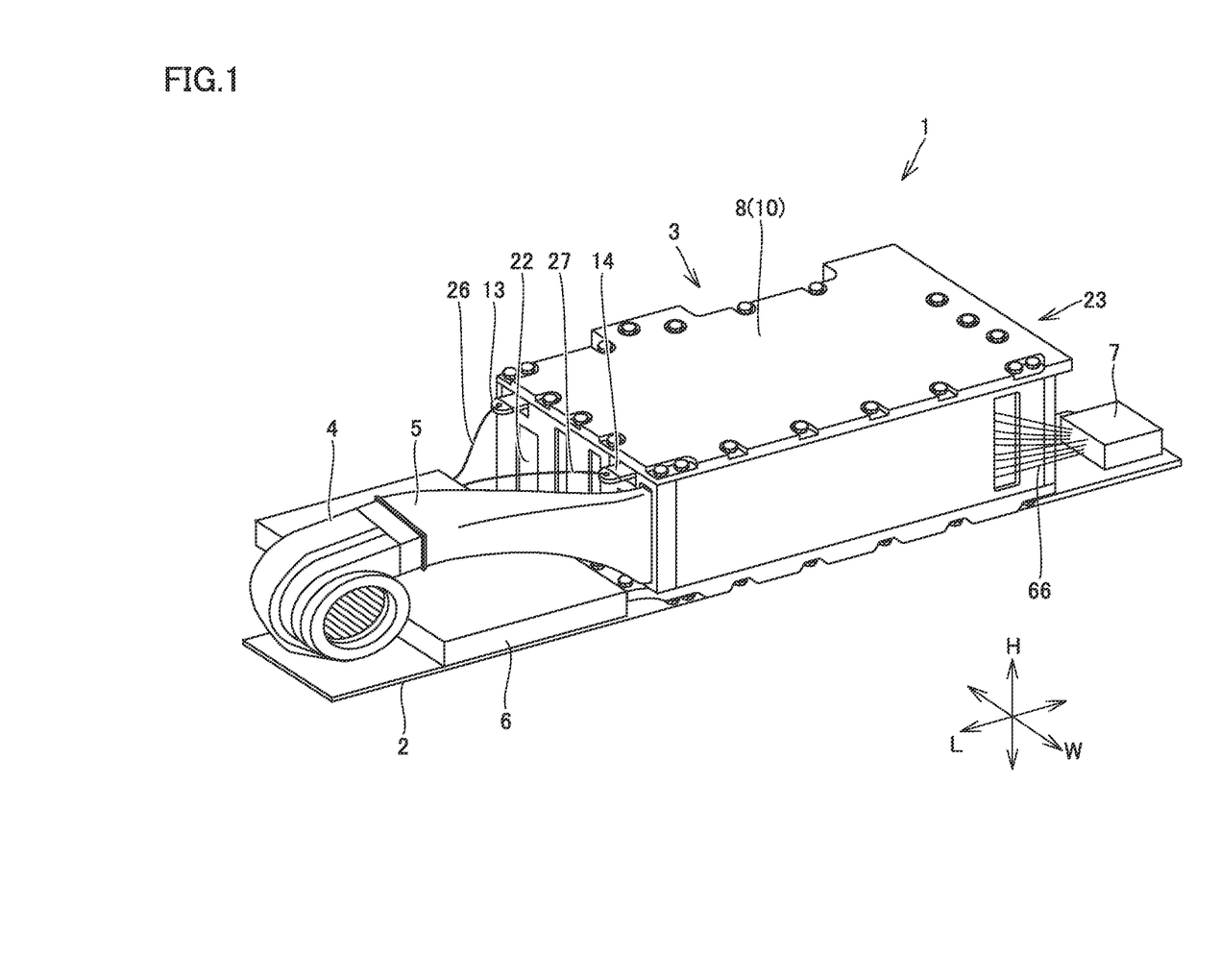
FIG. 1 is a perspective view showing a battery assembly 1 in accordance with the present embodiment.

FIG. 1 is a perspective view showing a battery assembly 1 in accordance with the present embodiment. Battery assembly 1 includes a base plate 2, a power storage device 3, a connection device (a first apparatus) 6, and a monitoring unit (a second apparatus) 7.

Base plate 2 is a plate-shaped member made of a metal. Power storage device 3 is provided on an upper surface of base plate 2.

Power storage device 3 includes an air blowing fan 4, an air blowing duct 5, and a power storage pack 8. Power storage pack 8 is provided on the upper surface of base plate 2.

Air blowing fan 4 is provided on the upper surface of base plate 2 to be spaced from power storage pack 8 in a longitudinal direction L. Air blowing duct 5 is provided to connect air blowing fan 4 and power storage pack 8. Then, when air blowing fan 4 is driven, cooling air is supplied through air blowing duct 5 into power storage pack 8.

Connection device 6 is arranged between air blowing fan 4 and power storage pack 8, and is provided on the upper surface of base plate 2 to be adjacent to power storage pack 8. A relay such as a system main relay (SMR), for example, is housed within connection device 6.

Monitoring unit 7 is provided opposite to connection device 6 with respect to power storage pack 8. Monitoring unit 7 is connected to sensors provided to power storage unit 10 to monitor the state of power storage unit 10.

Figure 2:
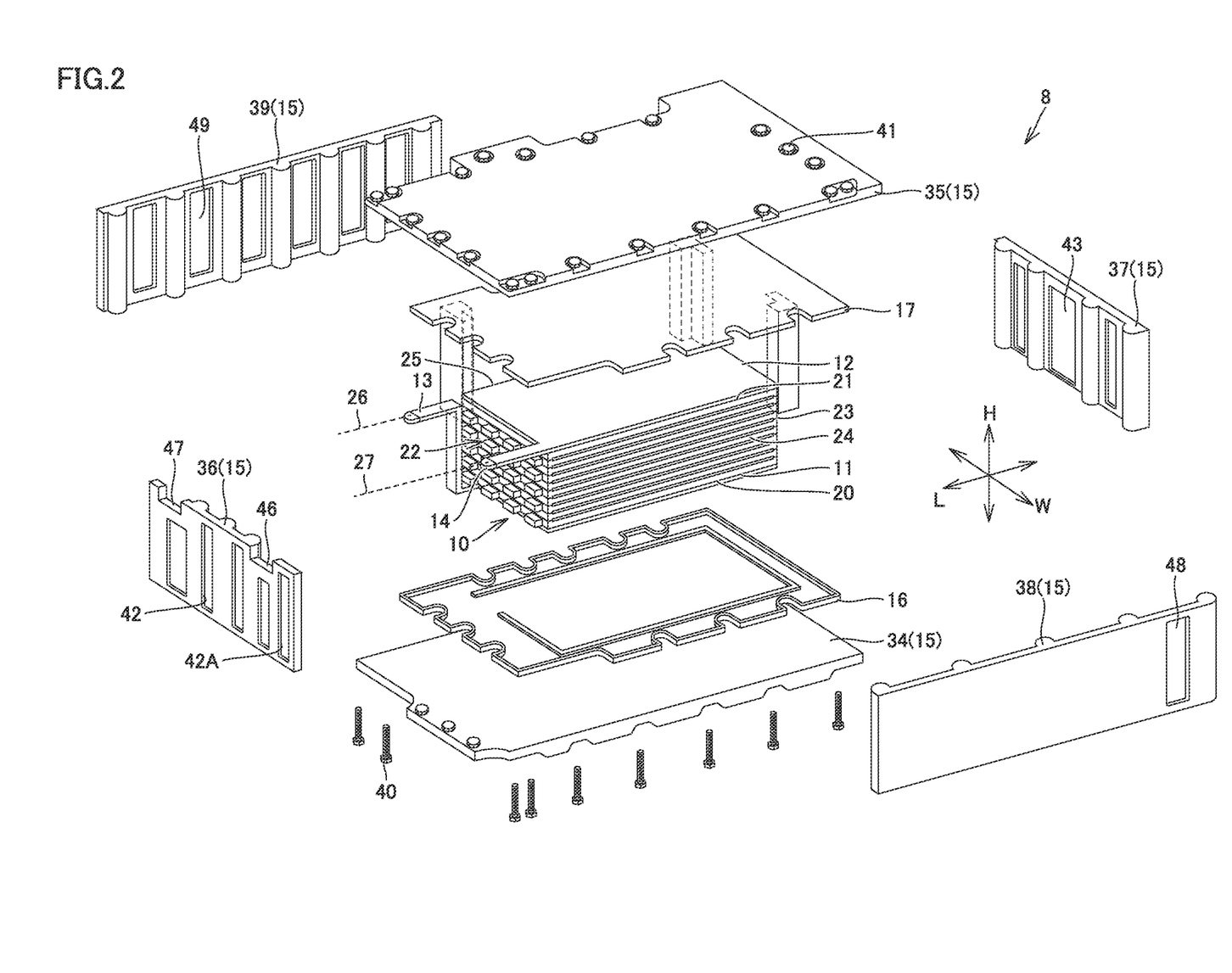
FIG. 2 is an exploded perspective view showing a power storage pack 8.

FIG. 2 is an exploded perspective view showing power storage pack 8. Power storage pack 8 includes a power storage unit 10, a positive electrode current collecting plate 11, a negative electrode current collecting plate 12, a positive electrode terminal (a first terminal) 13, a negative electrode terminal (a second terminal) 14, a housing case 15, and insulating plates 16 and 17. Power storage unit 10 is formed in a substantially rectangular parallelepiped shape.

Power storage unit 10 includes a lower end surface (a second end surface) 20, an upper end surface (a first end surface) 21, a short side surface (a first side surface) 22, a short side surface (a second side surface) 23, a long side surface (a third side surface) 24, and a long side surface (a fourth side surface) 25.

Lower end surface 20 is located at a lower end of power storage unit 10 in a height direction H, and upper end surface 21 is located at an upper end thereof in height direction H. Short side surfaces 22 and 23 and long side surfaces 24 and 25 connect upper end surface 21 and lower end surface 20. It should be noted that short side surface 22 and short side surface 23 are aligned in longitudinal direction L, and short side surface 23 is located opposite to short side surface 22. Long side surface 24 and long side surface 25 are aligned in a width direction W, and long side surface 25 is located opposite to long side surface 24. It should be noted that details of the configuration of power storage unit 10 will be described later.

Positive electrode current collecting plate 11 is provided on lower end surface 20 of power storage unit 10, and positive electrode terminal 13 is connected to positive electrode current collecting plate 11. Negative electrode current collecting plate 12 is provided on upper end surface 21 of power storage unit 10, and negative electrode terminal 14 is connected to negative electrode current collecting plate 12.

Positive electrode terminal 13 and negative electrode terminal 14 are provided at short side surface 22 of power storage unit 10. Positive electrode terminal 13 is connected to connection device 6 via a power wire 26, and negative electrode terminal 14 is connected to connection device 6 via a power wire 27.

Housing case 15 houses power storage unit 10, positive electrode current collecting plate 11, negative electrode current collecting plate 12, and insulating plates 16 and 17 therein.

Insulating plate 16 is arranged on a lower surface side of positive electrode current collecting plate 11, and insulating plate 17 is arranged on an upper surface side of negative electrode current collecting plate 12.

Housing case 15 includes a bottom plate 34, a top plate 35, short side plates 36 and 37, and long side plates 38 and 39. Bottom plate 34 is arranged on a lower surface side of insulating plate 16. Top plate 35 is arranged on an upper surface side of insulating plate 17. Short side plate 36 and short side plate 37 are arranged on a short side surface 22 side and a short side surface 23 side of power storage unit 10. Long side plate 38 and long side plate 39 are arranged on a long side surface 24 side and a long side surface 25 side of power storage unit 10.

Bottom plate 34 is fixed to short side plates 36 and 37 and long side plates 38 and 39 using a plurality of bolts 40. Top plate 35 is fixed to short side plates 36 and 37 and long side plates 38 and 39 using a plurality of bolts 41.

In addition, by a fastening force of bolts 40 and 41, bottom plate 34 and top plate 35 sandwich power storage unit 10 and insulating plates 16 and 17 therebetween, and restrain power storage unit 10 and insulating plates 16 and 17. It should be noted that bottom plate 34, top plate 35, short side plates 36 and 37, and long side plates 38 and 39 are made of a metal such as iron, for example, to secure rigidity of housing case 15.

A plurality of openings 42 are formed in short side plate 36 to be spaced from each other in width direction W. It should be noted that air blowing duct 5 shown in FIG. 1 is inserted into an opening 42A located on the long side surface 24 side of power storage unit 10, of the plurality of openings 42. Recesses 46 and 47 are formed in an upper edge of short side plate 36 to be spaced from each other in width direction W. Negative electrode terminal 14 is arranged in recess 46, and positive electrode terminal 13 is arranged in recess 47. A plurality of openings 43 are also formed in short side plate 37 to be spaced from each other in width direction W.

One opening 48 is formed in long side plate 38. Opening 48 is formed on the short side surface 23 side of power storage unit 10. A plurality of openings 49 are formed in long side plate 39 to be spaced from each other in longitudinal direction L.

Since the plurality of openings are formed in housing case 15 as described above, power storage unit 10 housed within housing case 15 is visible from the outside of power storage pack 8. Further, since the cooling air supplied into power storage pack 8 by air blowing fan 4 shown in FIG. 1 easily passes out of power storage pack 8 after cooling power storage unit 10, flow resistance of the cooling air is reduced.

Figure 3:
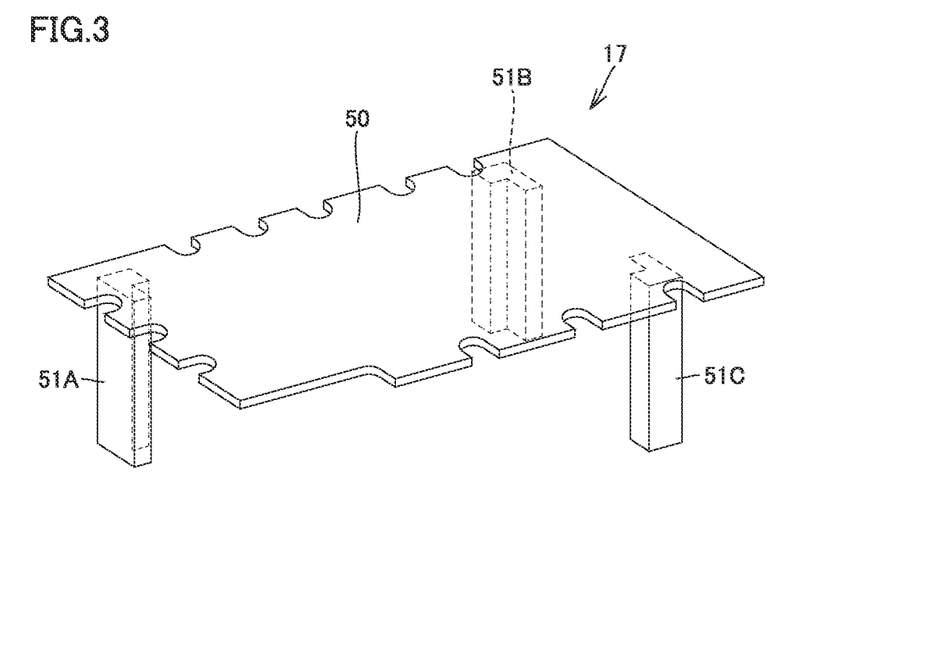
FIG. 3 is a perspective view showing an insulating plate 17.

FIG. 3 is a perspective view showing insulating plate 17. Insulating plate 17 includes a main plate (a first main plate) 50, and a plurality of support members 51A, 51B, and 51C. Main plate 50 is formed in a plate shape, and is formed in a substantially rectangular shape. Support members 51A, 51B, and 51C are each formed to extend from a lower surface of main plate 50 toward insulating plate 16.

In FIG. 2, support member 51A supports short side surface 22 and long side surface 25 of power storage unit 10. Support member 51B supports long side surface 25 and short side surface 23. Support member 51C supports short side surface 23 and long side surface 24. It should be noted that insulating plate 17 is not provided with a support member which supports short side surface 22 and long side surface 24.

Since the plurality of support members 51A, 51B, and 51C support power storage unit 10 as described above, misalignment of power storage unit 10 within housing case 15 is suppressed.

Figure 4:
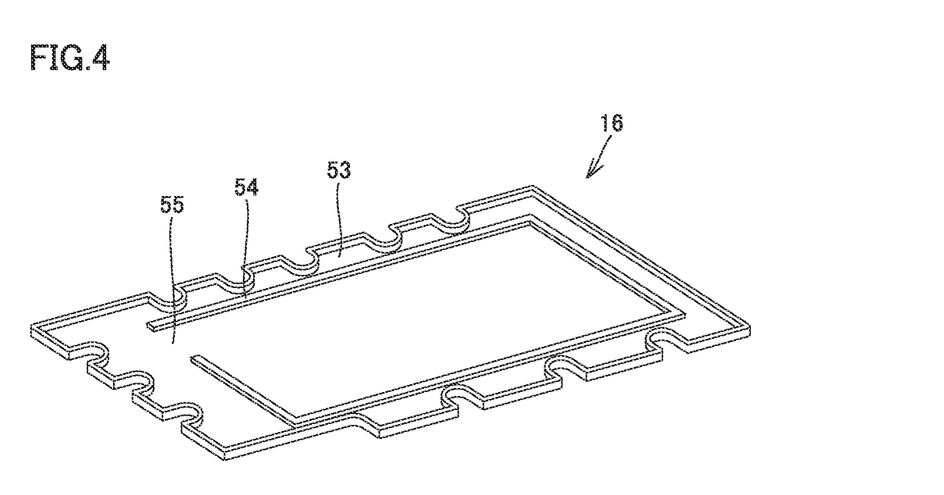
FIG. 4 is a perspective view showing an insulating plate 16.

FIG. 4 is a perspective view showing insulating plate 16. Insulating plate 16 includes a bottom plate (a second main plate) 53, and a rib 54 formed on an upper surface of bottom plate 53. Rib 54 extends along an outer circumferential edge of positive electrode current collecting plate 11, and is formed in a substantially annular shape. A notch 55 is formed in rib 54. Positive electrode terminal 13 shown in FIG. 2 is arranged in notch 55. Rib 54 suppresses insulating plate 16 from being misaligned with respect to power storage unit 10.

Figure 5:
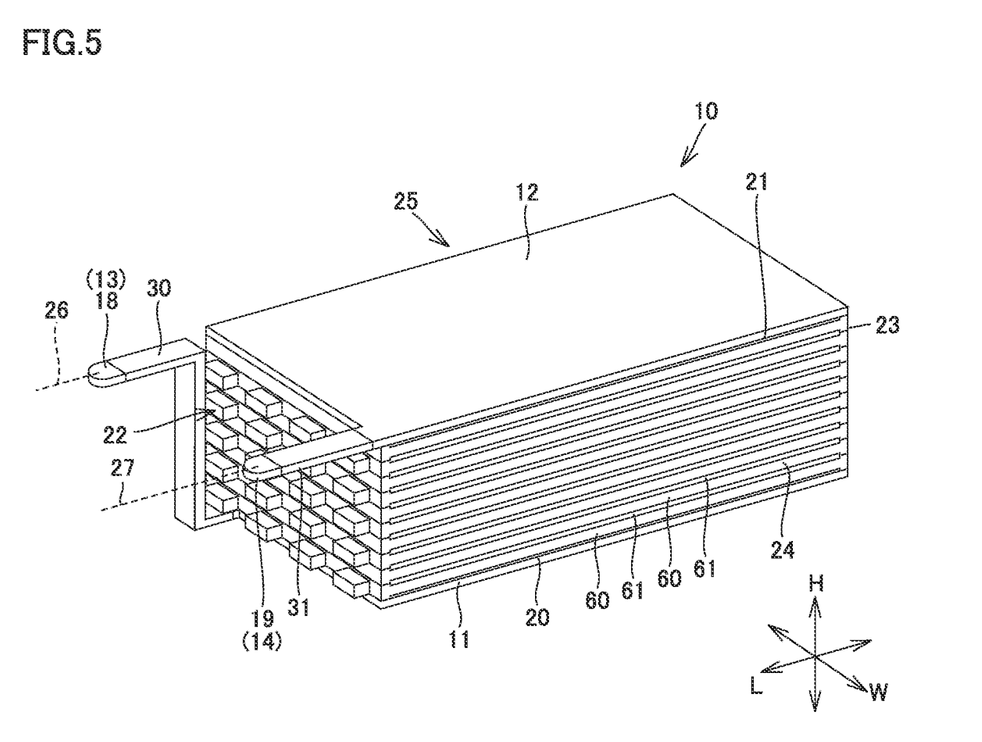

FIG. 5 is a perspective view showing power storage unit 10 and the like. Power storage unit 10 includes a plurality of power storage modules 60, and a plurality of cooling plates 61. Specifically, the plurality of power storage modules 60 are arranged to be spaced from each other in height direction (one direction) H, and each cooling plate 61 is arranged between power storage modules 60.

In addition, positive electrode current collecting plate 11 is provided on lower end surface 20, which is one end surface of power storage unit 10 in height direction H. Negative electrode current collecting plate 12 is provided on upper end surface 21, which is the other end surface of power storage unit 10 in height direction H.

Positive electrode current collecting plate 11 is formed in a substantially rectangular shape, and positive electrode terminal 13 is connected to an edge portion of positive electrode current collecting plate 11 located on the short side surface 22 side of power storage unit 10. Then, positive electrode terminal 13 extends upward, and is bent in the vicinity of negative electrode current collecting plate 12 to protrude toward longitudinal direction L. Positive electrode current collecting plate 11 and positive electrode terminal 13 are made of a metal material such as nickel, for example.

An insulating sleeve 30 is attached to a circumferential surface of positive electrode terminal 13. Insulating sleeve 30 is provided from a base portion of positive electrode terminal 13 on a positive electrode current collecting plate 11 side, to the vicinity of a tip portion 18 of positive electrode terminal 13. Thus, even though positive electrode terminal 13 is arranged in recess 47 shown in FIG. 2, insulation between positive electrode terminal 13 and short side plate 36 is secured.

Tip portion 18 of positive electrode terminal 13 is exposed from insulating sleeve 30, and power wire 26 is connected to tip portion 18. It should be noted that tip portion 18 is provided at a position protruding more outward than short side plate 36.

Negative electrode current collecting plate 12 is also formed in a substantially rectangular shape, and negative electrode terminal 14 is connected to an edge portion of negative electrode current collecting plate 12 located on the short side surface 22 side. Negative electrode terminal 14 is formed to protrude from the edge portion of negative electrode current collecting plate 12 in longitudinal direction L.

It should be noted that negative electrode current collecting plate 12 and negative electrode terminal 14 are made of a metal material such as nickel, for example.

An insulating sleeve 31 is also attached to a circumferential surface of negative electrode terminal 14. Thus, even though negative electrode terminal 14 is arranged in recess 46 shown in FIG. 2, negative electrode terminal 14 and short side plate 36 are insulated from each other by insulating sleeve 31.

It should be noted that a tip portion 19 of negative electrode terminal 14 is arranged more outward than short side plate 36, and power wire 27 is connected to tip portion 19. Tip portion 19 is also exposed from insulating sleeve 31.

Figure 6:
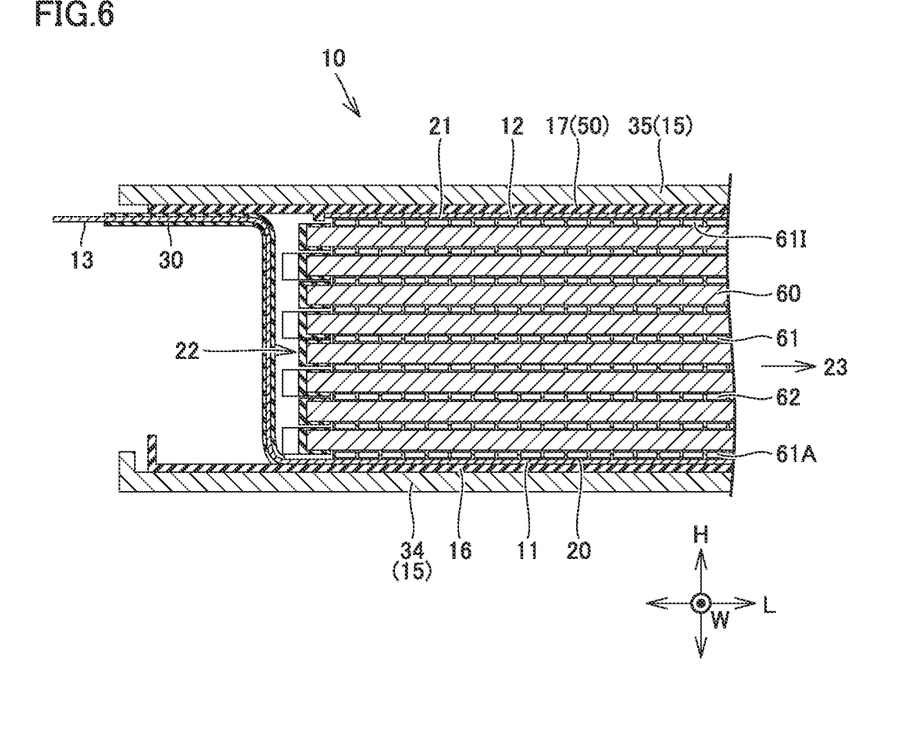

FIG. 6 is a cross sectional view showing power storage unit 10 and the like. Each cooling plate 61 is arranged between power storage modules 60 provided to be spaced from each other in height direction H.

Figure 7:
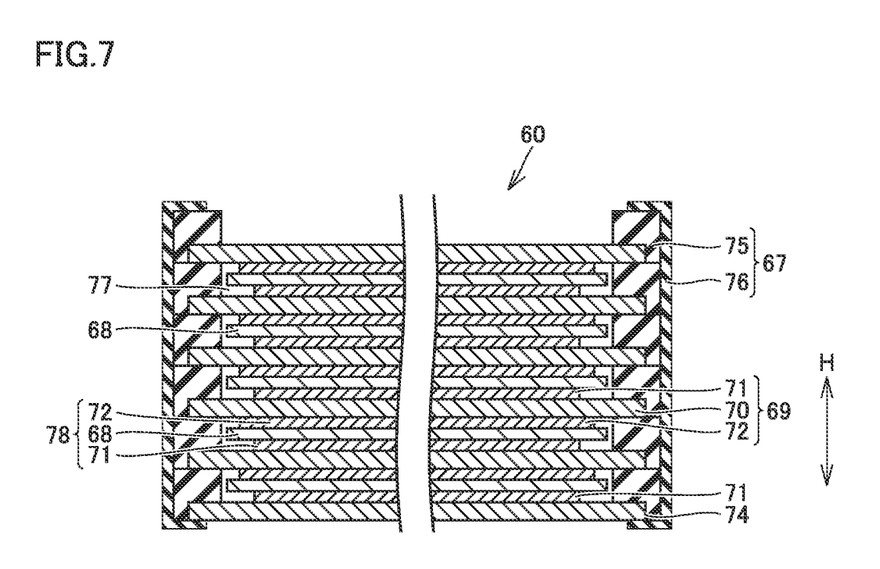
FIG. 7 is a cross sectional view showing a power storage module 60.

FIG. 7 is a cross sectional view showing power storage module 60. Power storage module 60 includes a plurality of bipolar electrode plates 69 stacked in height direction H (one direction), separators 68 each arranged between bipolar electrode plates 69, and a frame body 67.

Bipolar electrode plate 69 includes an electrode plate 70, a positive electrode layer 71, and a negative electrode layer 72. Electrode plate 70 is a metal foil made of nickel, for example. Positive electrode layer 71 is formed on an upper surface of electrode plate 70. Positive electrode layer 71 contains a positive electrode active material, and the positive electrode active material includes nickel hydroxide or the like, for example. Negative electrode layer 72 contains a negative electrode active material, and the negative electrode active material includes a hydrogen absorbing alloy or the like, for example. It should be noted that an edge 74 of electrode plate 70 is an unapplied portion in which positive electrode layer 71 and negative electrode layer 72 are not formed.

Here, when a current flows through stacked bipolar electrode plates 69, the current flows between positive electrode layer 71 and negative electrode layer 72 via each electrode plate 70. Each bipolar electrode plate 69 has a large contact area between electrode plate 70 and positive electrode layer 71 and a large contact area between electrode plate 70 and negative electrode layer 72, and has a low electrical resistance. As a result, electrical resistance of power storage module 60 including stacked bipolar electrode plates 69 can also be suppressed low.

Separator 68 is formed in a sheet shape, for example. Separator 68 is formed, for example, from a porous film made of a polyolefin-based resin such as polyethylene (PE) or polypropylene (PP), or a woven or nonwoven fabric made of polypropylene, polyethylene terephthalate (PET), methylcellulose, or the like.

Frame body 67 includes frame bodies 75 stacked in height direction H, and an outer frame 76 for fixing stacked frame bodies 75. Each frame body 75 covers edge 74 of electrode plate 70, and is annularly formed along edge 74.

Outer frame 76 engages frame body 75 located at one end in height direction H and frame body 75 located at the other end in height direction H, to fix a plurality of stacked frame bodies 75. Further, outer frame 76 is formed to cover circumferential surfaces of stacked frame bodies 75.

In addition, a housing space 77 is formed between frame bodies 75 and electrode plates 70 adjacent to each other in height direction H. Housing space 77 houses positive electrode layer 71, separator 68, negative electrode layer 72, and an electrolytic solution not shown. The electrolytic solution is an alkaline solution such as an aqueous potassium hydroxide solution, for example.

Thus, a power storage cell 78 including positive electrode layer 71, separator 68, negative electrode layer 72, and the electrolytic solution is formed within housing space 77. In addition, a plurality of power storage cells 78 are connected in series with each other via electrode plates 70.

Returning back to FIG. 6, since the plurality of bipolar electrode plates 69 are aligned in height direction H in each power storage module 60, and power storage modules 60 are also aligned in height direction H, the plurality of bipolar electrode plates 69 are aligned in height direction H.

Cooling plate 61 is made of a conductive metal material such as aluminum or copper. Thus, each cooling plate 61 connects power storage modules 60 adjacent to each other in height direction H, in series.

A cooling plate 61A is arranged at lower end surface 20 of power storage unit 10, and positive electrode current collecting plate 11 is in contact with a lower surface of cooling plate 61A. In addition, a cooling plate 61I is arranged at upper end surface 21 of power storage unit 10, and negative electrode current collecting plate 12 is in contact with an upper surface of cooling plate 61I.

Insulating plate 16 is arranged between positive electrode current collecting plate 11 and bottom plate 34, to insulate positive electrode current collecting plate 11 and power storage unit 10 from bottom plate 34. Main plate 50 of insulating plate 17 is arranged between negative electrode current collecting plate 12 and housing case 15, and insulation between top plate 35 and negative electrode current collecting plate 12 is secured by insulating plate 17.

Thereby, positive electrode current collecting plate 11, negative electrode current collecting plate 12, and power storage unit 10 are insulated from housing case 15.

It should be noted that an outer surface of cooling plate 61 may be plated with the same metal as that constituting positive electrode current collecting plate 11 and negative electrode current collecting plate 12. For example, when positive electrode current collecting plate 11 and negative electrode current collecting plate 12 are made of nickel, the outer surface of cooling plate 61 is plated with nickel. Thereby, the metals match well between cooling plate 61A and positive electrode current collecting plate 11, and contact resistance between cooling plate 61A and positive electrode current collecting plate 11 can be reduced. Similarly, contact resistance between cooling plate 61I and negative electrode current collecting plate 12 can be reduced.

Further, in the present embodiment, since electrode plate 70 in power storage module 60 is also made of nickel, contact resistance between power storage module 60 and cooling plate 61 is also reduced.

In each cooling plate 61, a plurality of cooling paths 62 are formed to be spaced from each other, from the short side surface 22 side toward the short side surface 23 side. Each cooling path 62 is formed to extend in width direction W. In addition, one end of each cooling path 62 is exposed at long side surface 24 shown in FIG. 5, and the other end of each cooling path 62 is exposed at long side surface 25.

Figure 8:
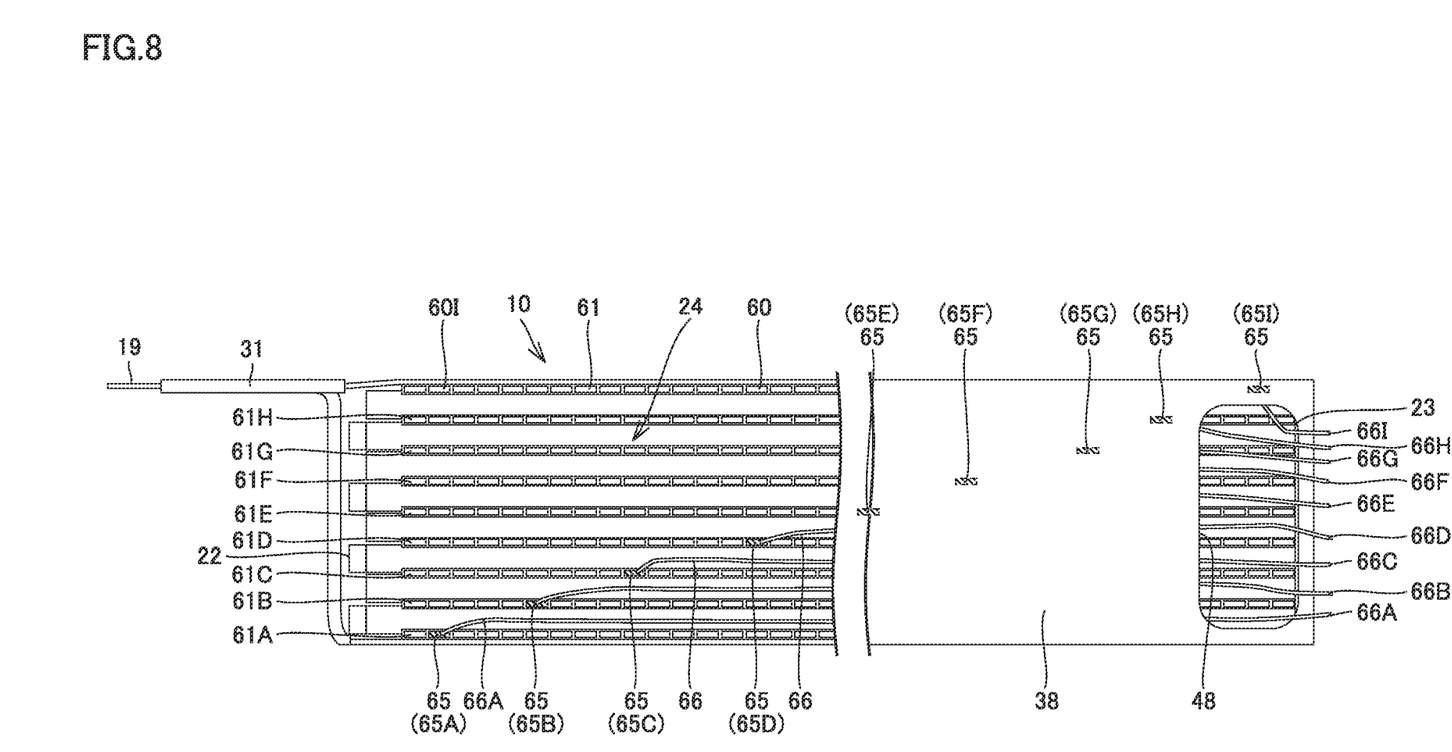
FIG. 8 is a side view showing power storage unit 10 and the like when viewed from a long side surface 24 side.

FIG. 8 is a side view showing power storage unit 10 and the like when viewed from the long side surface 24 side. It should be noted that FIG. 8 shows a portion of long side plate 38, power storage unit 10, and the like.

Power storage unit 10 includes a plurality of sensors 65 provided within power storage unit 10. Examples of sensors 65 include a temperature sensor, a current sensor, and the like.

Each sensor 65 is inserted into cooling path 62 in cooling plate 61, and one sensor 65 is arranged for each cooling plate 61. Each sensor 65 is arranged at a substantially central portion of power storage unit 10 in width direction W.

Specifically, sensors 65A, 65B, 65C, 65D, 65E, 65F, 65G, 65H, and 65I are arranged in cooling plates 61A, 61B, 61C, 61D, 61E, 61F, 61G, 61H, and 61I.

Wires 66A, 66B, 66C, 66D, 66E, 66F, 66G, 66H, and 66I are connected to sensors 65A, 65B, 65C, 65D, 65E, 65F, 65G, 65H, and 65I.

In addition, each wire 66A, 66B, 66C, 66D, 66E, 66F, 66G, 66H, or 66I is inserted into each cooling path 62, and is drawn out on the long side surface 24 side, from an opening of each cooling path 62 on the long side surface 24 side.

Wires 66A, 66B, 66C, 66D, 66E, 66F, 66G, 66H, and 66I drawn out on the long side surface 24 side extend in a direction from the short side surface 22 side toward the short side surface 23 side, and are drawn out on the short side surface 23 side, from opening 48 in long side plate 38.

Then, as shown in FIG. 1, a plurality of wires 66 are connected to monitoring unit 7 provided at a position adjacent to power storage unit 10 on the short side surface 23 side.

On the other hand, power wire 26 connected to positive electrode terminal 13 and power wire 27 connected to negative electrode terminal 14 are connected to connection device 6 arranged to be adjacent to the short side surface 22 side of power storage unit 10.

Thus, power wires 26 and 27 and wires 66 can be suppressed from being jumbled when power wires 26 and 27 are connected to connection device 6 and wires 66 are connected to monitoring unit 7. Thereby, connecting power wires 26 and 27 to connection device 6 and connecting wires 66 to monitoring unit 7 can be easily performed.

Figure 9:
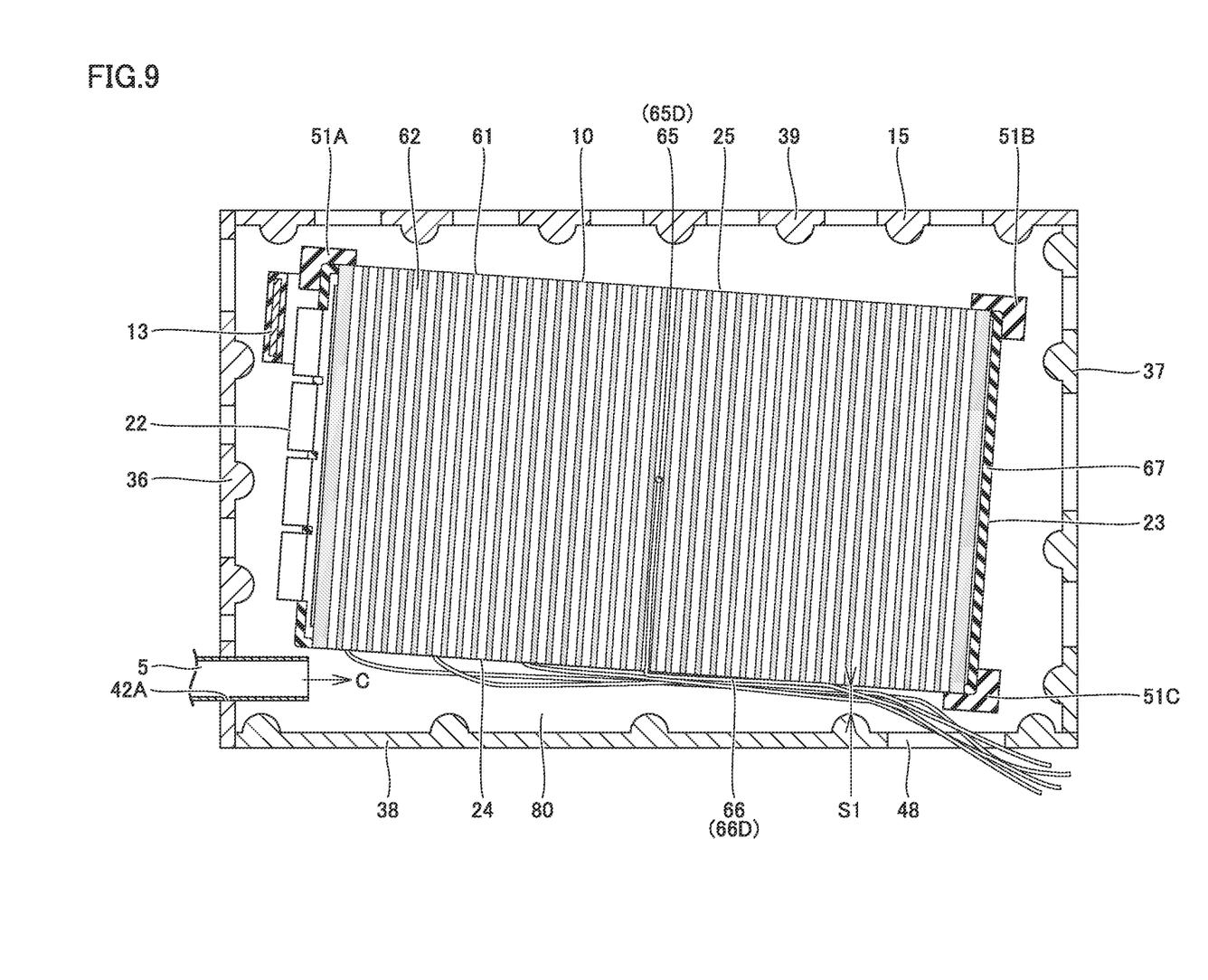
FIG. 9 is a cross sectional view schematically showing power storage pack 8.

FIG. 9 is a cross sectional view schematically showing power storage pack 8. Power storage unit 10 is arranged to be spaced from an inner circumferential surface of housing case 15, and a gap is formed between long side surface 24 of power storage unit 10 and long side plate 38 of housing case 15. The gap between long side surface 24 and long side plate 38 serves as an air flowing path 80 through which cooling air C flows. Air flowing path 80 is connected to opening 48 at downstream of a direction in which cooling air C flows.

Air blowing duct 5 is inserted into opening 42A in short side plate 36, and a tip portion of opening 42A is arranged at an upstream portion of air flowing path 80. One opening of cooling path 62 in cooling plate 61 is opened at long side surface 24. The other opening of cooling path 62 is opened at long side surface 25.

At least a portion of cooling air C supplied through air blowing duct 5 into air flowing path 80 enters cooling paths 62 in the course of flowing from the short side surface 22 side toward the short side surface 23 side.

Then, power storage modules 60 adjacent to cooling plate 61 in height direction H are cooled by cooling air C flowing through cooling paths 62. In particular, since cooling plate 61 is made of a metal having a high heat conductivity such as aluminum or copper, cooling plate 61 can satisfactorily cool power storage modules 60.

Power storage unit 10 is arranged to be inclined with respect to housing case 15. In addition, power storage unit 10 is arranged such that a distance between long side surface 24 of power storage unit 10 and an inner wall of long side plate 38 of housing case 15 decreases from the short side surface 22 side toward the short side surface 23 side.

A flow path area of cooling air C in air flowing path 80 decreases from the short side surface 22 side toward the short side surface 23 side. The flow path area of air flowing path 80 is a cross sectional area of air flowing path 80 in a direction perpendicular to a direction from short side surface 22 toward short side surface 23. A downstream portion of air flowing path 80 is in communication with opening 48.

In FIG. 9, a flow path area S1 is a flow path area on a slightly upstream side with respect to opening 48, and flow path area S1 is the minimum flow path area.

Thus, since air flowing path 80 has a small flow path area on a downstream side, the pressure of cooling air C on the downstream side of air flowing path 80 becomes higher than the pressure of cooling air C on an upstream side of air flowing path 80.

When cooling air C flows through air flowing path 80, due to flow resistance, the air is less likely to flow to the downstream side of air flowing path 80, and cooling air C is less likely to enter cooling paths 62 located on the downstream side of air flowing path 80. On the other hand, due to high pressure on the downstream side of air flowing path 80, cooling air C also enters cooling paths 62 located on the downstream side of air flowing path 80 as a result. Consequently, this can suppress occurrence of a difference in the flow amount of cooling air C between cooling paths 62 located on the upstream side of air flowing path 80 and cooling paths 62 located on the downstream side thereof.

Here, as shown in FIGS. 9 and 8, the plurality of wires 66A to 66I are drawn out of long side surface 24 of power storage unit 10. Drawn-out positions where wires 66A to 66I are drawn out of cooling paths 62 are arranged to proceed from the short side surface 22 side toward the short side surface 23 side, as the drawn-out positions proceed from the lower end surface 20 side toward the upper end surface 21 side of power storage unit 10.

When wires 66A to 66I are arranged within air flowing path 80, the flow path area of air flowing path 80 decreases accordingly. In the present embodiment, as described above, wires 66 are sequentially drawn out into air flowing path 80 toward the downstream side of the direction in which cooling air C flows. As a result, the flow path area is narrowed by wires 66A to 66I from the upstream side toward the downstream side of air flowing path 80. Thus, the flow path area of air flowing path 80 decreases also by adjusting the drawn-out positions of wires 66A to 66I, and as a result, the pressure on the downstream side of air flowing path 80 is increased.

It should be noted that each of wires 66A to 66I extends from the short side surface 22 side toward the short side surface 23 side, and extends in the same direction as the direction in which cooling air C flows. Thereby, wires 66A to 66I guide cooling air C, and reduce the flow resistance of cooling air C.

Figure 10:
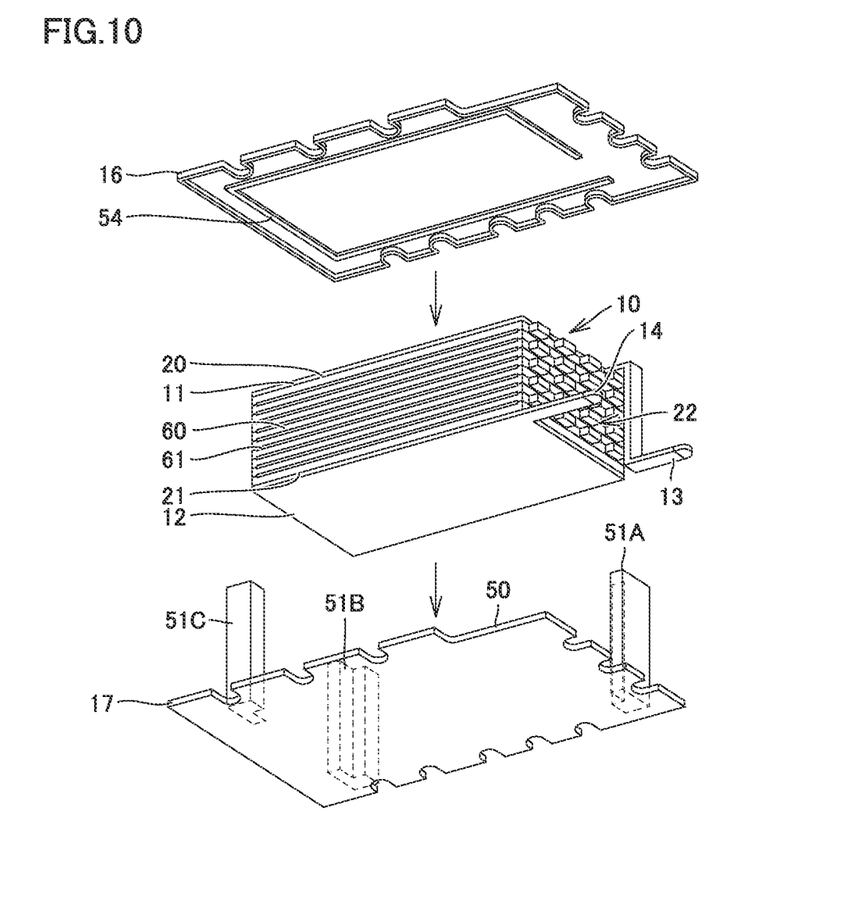
FIG. 10 is a perspective view schematically showing a process of assembling power storage pack 8.

A method for assembling power storage pack 8 configured as described above will be described. FIG. 10 is a perspective view schematically showing a process of assembling power storage pack 8. Negative electrode current collecting plate 12, cooling plates 61, power storage modules 60, positive electrode current collecting plate 11, and insulating plate 16 are stacked on the main surface of insulating plate 17.

On this occasion, since insulating plate 17 is provided with support members 51A to 51C, misalignment of the members can be suppressed when negative electrode current collecting plate 12, cooling plates 61, power storage modules 60, positive electrode current collecting plate 11, and insulating plate 16 are stacked.

In addition, since rib 54 is formed in insulating plate 16, insulating plate 16 can be accurately positioned with respect to positive electrode current collecting plate 11. This can suppress misalignment of insulating plate 16 with respect to power storage unit 10 over which insulating plate 16 is stacked.

Then, short side plates 36 and 37, long side plates 38 and 39, top plate 35, and bottom plate 34 are fixed using bolts 40 and 41, with power storage unit 10 and insulating plates 16 and 17 being sandwiched between top plate 35 and bottom plate 34. Thereby, power storage pack 8 can be produced.

It should be noted that, although the above embodiment has described an example where the direction in which power storage modules 60 and cooling plates 61 are stacked is set to height direction H, the direction in which power storage modules 60 and cooling plates 61 are stacked may be set to a horizontal direction.

Although the embodiment of the present disclosure has been described, it should be understood that the embodiment disclosed herein is illustrative and non-restrictive in every respect. The scope of the present disclosure is defined by the scope of the claims, and is intended to include any modifications within the scope and meaning equivalent to the scope of the claims.

What is claimed is:

1. A power storage device comprising
    a power storage unit;
    a first current collecting plate and a second current collecting plate provided to the power storage unit;
    a first terminal provided to the first current collecting plate;
    a second terminal provided to the second current collecting plate;
    at least one sensor provided to the power storage unit; and
    at least one wire connected to the sensor,
    the power storage unit including
        a first side surface, and
        a second side surface located opposite to the first side surface,
    the first terminal and the second terminal being provided on a first side surface side, and being connected to a first apparatus arranged on the first side surface side,
    the wire extending in a direction from the first side surface toward the second side surface, and being connected to a second apparatus provided on a second side surface side.

2. The power storage device according to claim 1, wherein
    the power storage unit includes a first end surface and a second end surface aligned in a first direction,
    the first side surface and the second side surface are provided to connect the first end surface and the second end surface,
    the first current collecting plate is provided on the first end surface, and the second current collecting plate is provided on the second end surface, and
    the power storage unit includes a plurality of bipolar electrode plates aligned in the first direction.

3. The power storage device according to claim 1, further comprising:
    a housing case configured to house the power storage unit; and
    a fan configured to supply cooling air from the first side surface side into the housing case, wherein
    the power storage unit includes a third side surface located between the first side surface and the second side surface, and a fourth side surface located opposite to the third side surface,
    an air flowing path is formed between a wall surface of the housing case and the third side surface of the power storage unit, the cooling air flowing into the air flowing path,
    the power storage unit includes at least one cooling plate having a plurality of cooling paths formed therein, the cooling air having passed through the air flowing path flowing into the plurality of cooling paths,
    the plurality of cooling paths are formed from the first side surface side toward the second side surface side, and
    a flow path area of the cooling air in the air flowing path decreases from the first side surface side toward the second side surface side.

4. The power storage device according to claim 3, wherein
    the power storage unit includes a first end surface and a second end surface aligned in a first direction,
    a plurality of the cooling plates are arranged to be spaced from each other, from the first end surface toward the second end surface,
    a plurality of the sensors and a plurality of the wires are provided,
    the sensors are arranged within the cooling paths,
    the wires are drawn out of the cooling paths from a third side surface side, and
    drawn-out positions where the wires are drawn out of the cooling paths are arranged to proceed from a first end surface side toward a second end surface side, as the drawn-out positions proceed from the first side surface side toward the second side surface side.

5. The power storage device according to claim 3, further comprising a first insulating plate and a second insulating plate, wherein
    the power storage unit includes a first end surface and a second end surface aligned in a first direction,
    the first current collecting plate is provided on the first end surface of the power storage unit,
    the second current collecting plate is provided on the second end surface of the power storage unit,
    the first insulating plate is arranged between the first current collecting plate and the housing case,
    the second insulating plate is arranged between the second current collecting plate and the housing case, and
    the first insulating plate includes a first main plate, and a support member extending from the first main plate toward the second insulating plate to support the power storage unit.

6. The power storage device according to claim 5, wherein the second insulating plate includes a second main plate, and a rib formed on the second main plate to support the power storage unit.

* * * * *